(12) United States Patent
Xiao et al.

(10) Patent No.: US 10,942,550 B2
(45) Date of Patent: Mar. 9, 2021

(54) SYSTEM AND PROCESS FOR ENABLING SECURE, INSTANT, AND ANONYMOUS COMMUNICATION BETWEEN PHYSICALLY TOUCHING DEVICES

(71) Applicant: Carnegie Mellon University, Pittsburgh, PA (US)

(72) Inventors: Bo Robert Xiao, Pittsburgh, PA (US); Christopher Harrison, Pittsburgh, PA (US); Scott E. Hudson, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/095,620

(22) PCT Filed: Apr. 20, 2017

(86) PCT No.: PCT/US2017/028484
§ 371 (c)(1),
(2) Date: Oct. 22, 2018

(87) PCT Pub. No.: WO2017/184800
PCT Pub. Date: Oct. 26, 2017

(65) Prior Publication Data
US 2019/0138063 A1 May 9, 2019

Related U.S. Application Data

(60) Provisional application No. 62/391,145, filed on Apr. 20, 2016.

(51) Int. Cl.
*G06F 1/16* (2006.01)
*H04M 1/725* (2006.01)
(Continued)

(52) U.S. Cl.
CPC .......... *G06F 1/1694* (2013.01); *G06F 1/1626* (2013.01); *G06F 1/1686* (2013.01);
(Continued)

(58) Field of Classification Search
CPC .. G06F 1/1694; G06F 3/0304; G06F 3/04886; G06F 3/017; G06F 1/1626;
(Continued)

(56) References Cited

U.S. PATENT DOCUMENTS

2001/0044858 A1* 11/2001 Rekimoto ............... G06F 3/011
710/1
2005/0041669 A1 2/2005 Cansever et al.
(Continued)

OTHER PUBLICATIONS

International Search Report and Written Opinion of International Application No. PCT/US2017/028484 dated Jul. 20, 2017, 17 pages.
(Continued)

*Primary Examiner* — Md Saiful A Siddiqui
(74) *Attorney, Agent, or Firm* — Kacvinsky Daisak Bluni PLLC

(57) ABSTRACT

The present invention includes provides secure, instant, and anonymous connections between two devices. The invention pairs a "cap" device with a capacitive touchscreen to a "cam" device with a camera sensor. For example, typical smartphones and tablets can be paired with each other, and these devices can be paired to even larger touchscreens, such as smart whiteboards and touchscreen monitors. The invention uses the cap device's touchscreen to detect and track the cam device, and displays color-modulated pairing data directly underneath the camera once the camera is touching the screen. The pairing data is used as configuration data for a bidirectional link, such as an ad-hoc WiFi or Bluetooth link. These links are established without requiring user configuration. As such, the present invention provides a
(Continued)

unidirectional communication mechanism from the touchscreen to the camera, which is used to bootstrap a full bidirectional, high-speed link.

18 Claims, 7 Drawing Sheets

(51) Int. Cl.
| | | |
|---|---|---|
| *G06F 3/0488* | (2013.01) | |
| *G06F 3/01* | (2006.01) | |
| *G06F 3/03* | (2006.01) | |
| *G06F 3/044* | (2006.01) | |

(52) U.S. Cl.
CPC ............ *G06F 1/1698* (2013.01); *G06F 3/017* (2013.01); *G06F 3/0304* (2013.01); *G06F 3/0488* (2013.01); *G06F 3/04886* (2013.01); *H04M 1/7253* (2013.01); *G06F 3/044* (2013.01); *H04M 2250/02* (2013.01); *H04M 2250/06* (2013.01); *H04M 2250/22* (2013.01); *H04M 2250/52* (2013.01)

(58) Field of Classification Search
CPC ...... G06F 3/044; G06F 3/0488; G06F 1/1698; G06F 1/1686
See application file for complete search history.

(56) References Cited

U.S. PATENT DOCUMENTS

| | | | |
|---|---|---|---|
| 2008/0229194 A1* | 9/2008 | Boler | G06F 3/002 |
| | | | 715/700 |
| 2009/0128779 A1* | 5/2009 | Moshe | G03B 21/32 |
| | | | 352/40 |
| 2009/0176451 A1 | 7/2009 | Yang et al. | |
| 2009/0195402 A1 | 8/2009 | Izadi et al. | |
| 2010/0045627 A1* | 2/2010 | Kennedy | G06F 3/0416 |
| | | | 345/173 |
| 2011/0121950 A1* | 5/2011 | Izadi | H04W 76/14 |
| | | | 340/10.5 |
| 2011/0195665 A1 | 8/2011 | Friedlaender | |
| 2012/0208466 A1 | 8/2012 | Park et al. | |
| 2012/0287290 A1 | 11/2012 | Jain | |
| 2013/0321336 A1* | 12/2013 | Li | G06F 3/0416 |
| | | | 345/174 |
| 2015/0009248 A1* | 1/2015 | Bracalente | G09G 5/02 |
| | | | 345/691 |
| 2015/0050887 A1 | 2/2015 | Brown et al. | |
| 2015/0065046 A1* | 3/2015 | Wilfred | H04L 63/18 |
| | | | 455/41.2 |
| 2015/0256522 A1 | 9/2015 | Jeffrey | |
| 2016/0226292 A1* | 8/2016 | Yoon | H02J 50/10 |

OTHER PUBLICATIONS

International Preliminary Report on Patentability of International Application No. PCT/US2017/028484 dated Nov. 1, 2018, 7 pages.

* cited by examiner

SYSTEM AND PROCESS FOR ENABLING SECURE, INSTANT, AND ANONYMOUS COMMUNICATION BETWEEN PHYSICALLY TOUCHING DEVICES

RELATED APPLICATIONS

This application is a national phase filing claiming the benefit of and priority to International Patent Application No. PCT/US2017/028484, filed on Apr. 20, 2017, which claims the benefit of U.S. Prov. Pat. App. No. 62/391,145, filed Apr. 20, 2016. The entire contents of these applications are incorporated herein by reference.

BACKGROUND

Recent years have seen an incredible proliferation in "smart" personal devices, such as wearables, smartphones and tablets. Larger displays, such as TV-sized touchscreens and smart whiteboards, are also becoming commonplace. While many such devices are reasonably smart on their own, cross-device interaction holds much promise for making devices even more capable and intelligent.

Cross-device pairing is commonly implemented using a wireless technology, such as WiFi or Bluetooth. Today, pairing devices is often cumbersome, requiring users to manually key in connection parameters (device or network) and security parameters (passphrase, PIN or pairing code). Though short-range NFC avoids many of these issues, as a wireless communication system, it is still subject to interception and man-in-the-middle attacks. Further, it is generally single device to single device, and lacks rich metadata such as spatial position of devices.

An ideal pairing solution would have the following properties:

Zero-configuration. Pairing should only use information already known to both devices.

Rapid. Pairing should be fast, ideally less than a few seconds from the start of the user pairing action to the establishment of a working connection.

Multi-device. Many devices should be able to pair simultaneously and continuously, each with their own secure and unique connection.

Anonymous. The pairing process itself should be anonymous. While the devices may later choose to exchange private data, an anonymous pairing procedure enables many more applications.

Explicit. The initial pairing should be explicitly initiated by a user action, so that user intent is clear.

Secure. The pairing should be difficult for attackers to intercept, tamper with, or forge.

Targeted. Pairing at a device level is fairly coarse, ideally, pairing should provide fine-grained additional information, such as a desired function or onscreen item.

Rich Metadata. Rich applications are enabled by rich sensed metadata. Ideal systems provide such data to both the host screen and end device.

Several techniques achieve some subset of these properties. For example, WiFi and Bluetooth are explicit and can be secure, but require configuration and are often not rapid due to configuration overhead. NFC is zero-configuration and rapid, but not inherently targeted or secure. PhoneTouch is explicit, targeted, but not zero-configuration or secure. Other proposed methods pair devices when they tap one another (using vibro-acoustic and timing data), which is zero-configuration and moderately secure, but not targeted, in that the pairing is only at a device-to-device level.

Interaction techniques for establishing an ad hoc connection between devices in a convenient but secure fashion have been proposed by several researchers. Such systems differ in terms of the actions users must undertake to establish an association between devices. For example, simple placement of a phone in view of a camera on a specially augmented surface, gestures performed by the user with a mobile device, or synchronous motion or input on two devices, among others.

The technical means used to establish and verify device associations have been similarly varied. For example, with synchronous device manipulation, matching of inputs has been done with correlation of signals from accelerometers in two devices and, for gesture-based actions, correlation between an accelerometer and a vision-based sensor. Notably, many of these systems require the devices to already be connected somehow to correlate the inputs and verify the pairing action.

A number of systems have used optical transmission and sensing for pairing devices and several have explored the general problem of transmitting data between devices using color-coding. These include techniques using hue differentials for coding and techniques which use color transitions for coding.

A phone or other device with knowledge of where it is located in space can be used as an auxiliary input and/or display device to augment interaction with a larger device. For example they may be used as a magic lens style display to provide physical detail+context displays or, in a large context, as a peephole display, which displays a small part of a much larger surface. In particular, one system uses a hue encoding technique to transmit a phone's x-y position on a display to the phone's camera, enabling spatial tracking of the phone on ordinary displays.

A few systems come close to achieving the desired properties listed above. A system known as "BlueTable" tracks phones on a surface using an overhead camera, and pairs with them via infrared flashes from the IrDA transceiver. This system was able to transfer data at 2.67 bits per second using binary encoding. Another system, known as "FlashLight" transmits pairing data from an infrared touch table to a phone resting on it. A simple color transition scheme is used to transmit approximately one bit per frame to the phone's camera, achieving a transmission rate of 33 bits per second.

BRIEF SUMMARY OF THE INVENTION

The invention described herein operates with commodity capacitive touch sensors, offers significantly higher data transmission rates, explicitly implements and describes the phone tracking approach, and generalizes the approach beyond tabletops to include consumer touch devices.

The invention, described herein as "CapCam", includes a technique that provides secure, instant and anonymous connections between two devices. CapCam pairs a "cap" device (a device with a capacitive touchscreen) to a "cam" device (a device with a camera sensor). For example, typical smartphones and tablets can be paired with each other, and these devices can be paired to even larger touchscreens, such as smart whiteboards and touchscreen monitors.

CapCam uses the cap device's touchscreen to detect and track the cam device, and displays color-modulated pairing data directly underneath the camera once the camera of the cam device is touching the screen of the cap device. The pairing data is used as configuration data for a bidirectional link, such as an ad hoc WiFi or Bluetooth link. The transmitted pairing data enables these links to be established without requiring user configuration. In this way, CapCam provides a unidirectional communication mechanism from the touchscreen of the cap device to the camera of the cam device, which is used to transmit pairing data that can be used to bootstrap a full bidirectional, high-speed link.

Users explicitly initiate pairing by placing the cam device on the touchscreen of the cap device. The cap device detects the camera and displays the pairing code, which is securely received by the camera sitting directly on top. Users can target the interaction to particular tasks by placing the camera on specific areas of the cap device's screen.

The present invention makes attacks difficult in four distinct ways: 1) the handshake requires physical presence; 2) only a single user can use a given pairing code; 3) attackers would require a well-positioned, oblique camera to capture the pairing data; and 4) attackers would need to overcome obfuscating patterns produced by the display.

Thus, CapCam achieves some level of all eight of the desired properties—it provides zero-configuration pairing via automatically transmitted pairing codes; it is rapid, capable of establishing links in under a second; anonymous, in that it requires no hardware identifying information to pair devices; explicitly initiated by user action; secure, in that interception of the pairing code is difficult for attackers; and finally, it enables targeted interactions for simultaneous multiple devices, and in the process, can expose rich metadata about paired devices.|

DETAILED DESCRIPTION OF THE INVENTION

In addition to describing the CapCam implementation, several new applications and interactions enabled by the pairing technique are described below. Further, the present invention also compares pairing latency, pairing code bandwidth and bit error rate across three different displays.

The cap device in CapCam can be any capacitive touchscreen device, ranging from large public kiosks to small mobile phones. To demonstrate this range, several different off-the-shelf consumer devices were used for development and testing. Importantly, these devices represent a wide range of sizes and pixel densities. It should be noted that any device having the requisite components could be used.

Smartphone—A stock Nexus 5 running Android 5.0.1 was used, which features a screen resolution of 1080×1920 pixels running at 60 fps and a 5" diagonal screen (445 pixels per inch) with a touchscreen update rate of 120 Hz.

Laptop—Laptops increasingly feature touchscreens, and so a laptop was chosen as the second display platform. A MacBook Pro was selected, however, this model computer does not contain a touchscreen, preventing any interactive demos from being built. The MacBook has a 2880×1800 pixel 15" screen (220 PPI) running at 60 fps.

Large Interactive Surface—As a demonstration of large CapCam-driven interactions, a Microsoft Perceptive Pixel 55" display was used, with a resolution of 1920×1080 pixels (40 PPI) at 60 Hz. The display has a touchscreen update rate of 120 Hz.

Figure 1A:
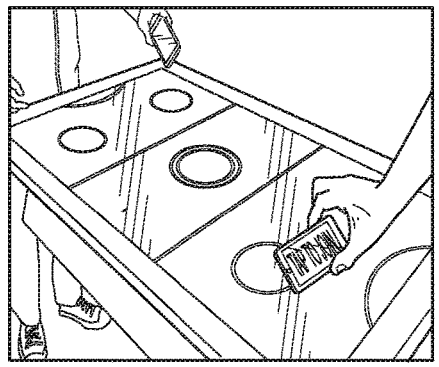
FIG. 1 shows an air hockey game as an example of a context-sensitive placement of the cam device on the cap device's touchscreen to initiate a particular application or action. (A) Players are invited to join the game. (B) When players press their phones to the table, CapCam rapidly and anonymously pairs the phones to the display. When two phones are paired, the game begins. (C) Players use their physical phones to deflect the virtual puck. CapCam tracks the phones and their orientations on the screen. (D) Sounds, vibrations and player-specific information appear on the phone, directed by the game through the paired connection.
Figure 1B:
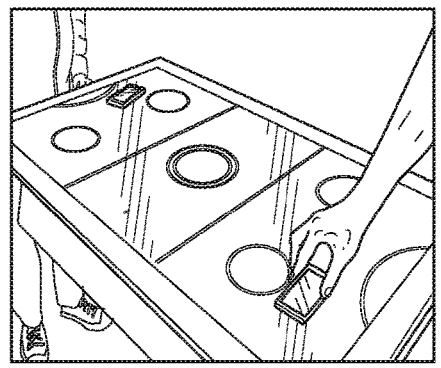
Figure 1C:
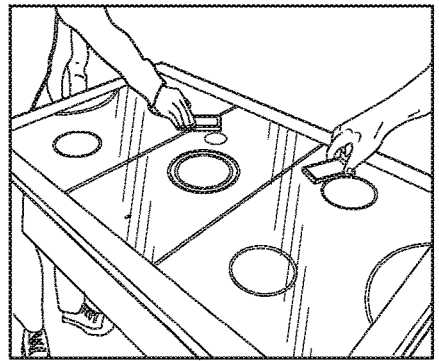
Figure 1D:
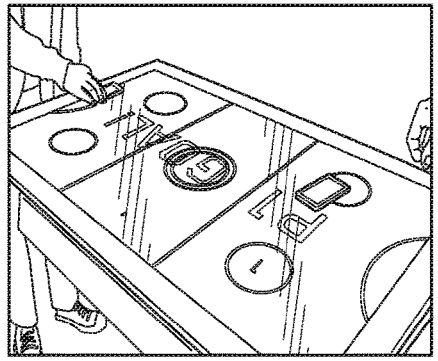
Figure 2:
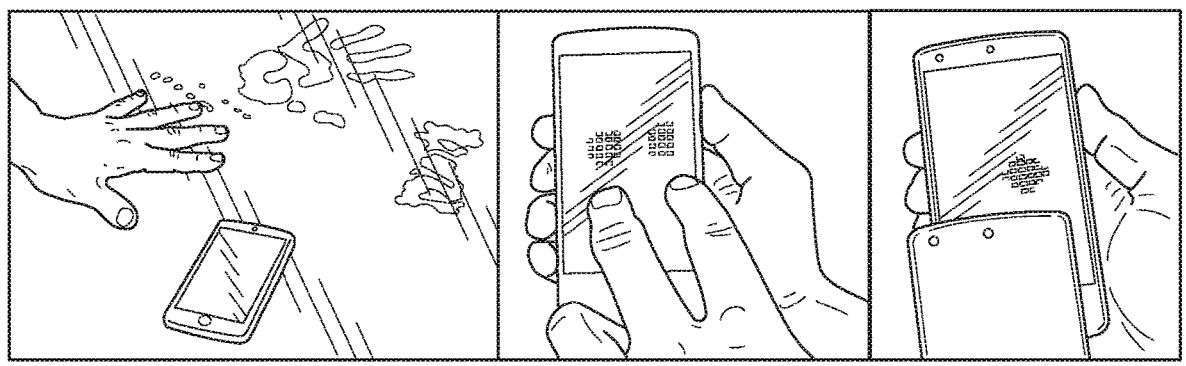
FIG. 2 illustrates raw capacitive images on a large touchscreen display (left) and a Nexus 5 smartphone (mid, right). Images are offset from the object. The metallic camera ring of another Nexus 5 smartphone is visible on the right image.

The raw capacitive image produced by the touchscreen controller, as shown in FIG. 2, was used to implement the tracking algorithms, which were designed for finding phones and touches simultaneously.

To initiate the pairing process, the cam device (typically a smartphone or mobile device) should be placed on the touchscreen surface of the cap device with the camera facing the touchscreen of the cap device. If the cam device features both a front-facing camera and a rear-facing camera, the camera on the side of the device opposite the touchscreen should be used on the cam device. Otherwise, the phone's touchscreen will not be accessible, preventing certain interactions.

Figure 4:
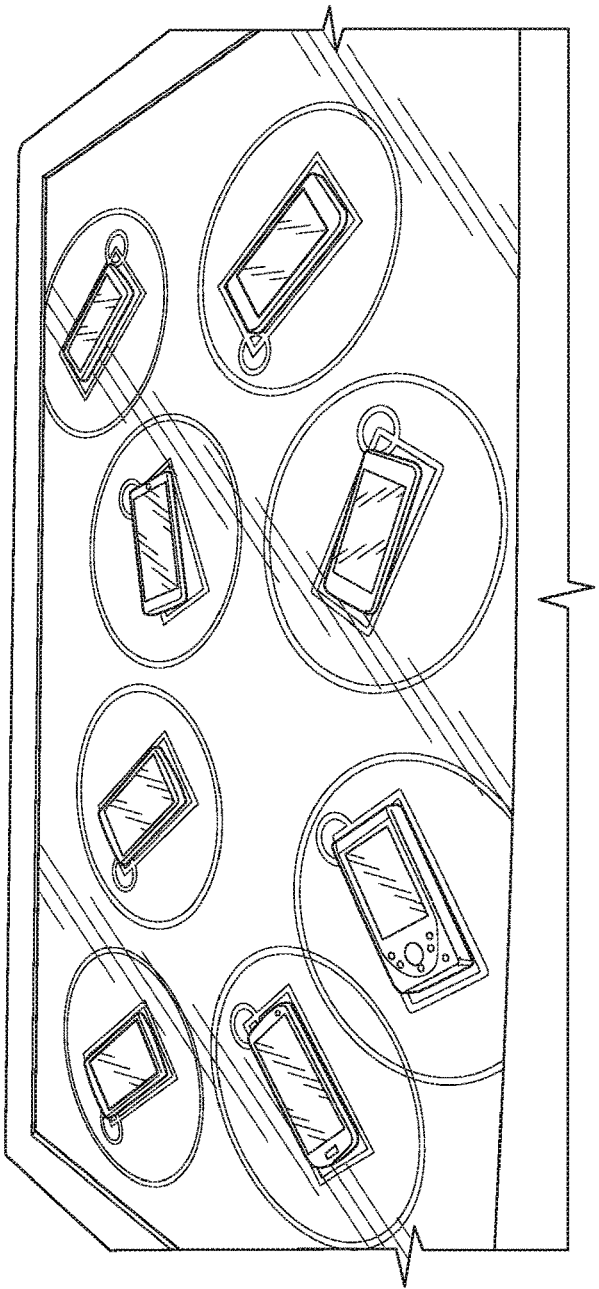
FIG. 4 shows multiple devices simultaneously tracked on the large touch screen.

On a small cap device, such as a smartphone, the cam devices are tracked by tracking the metallic ring that often surrounds camera modules, as shown in the rightmost image in FIG. 2. On a large interactive cap device, cam devices are discovered by tracking the rectangular capacitive imprint of the entire device, as shown in the leftmost image in FIG. 2. When a phone is placed on the surface, the phone creates a characteristic disturbance under the entire area of the phone. A connected components algorithm is used to detect blobs in the image. The blob size is used to determine whether the blob represents a phone or a finger touch. For phones, a rectangle is then fit to the blob to extract the approximate bounding box of the phone, as shown in FIG. 4. This fitting is achieved by simple brute force: a bounding box is fit to the blob, rotated by each angle from 0° to 90° in steps of 0.5°, and the angle that produces the smallest bounding box is chosen. The entire phone and touch sensing procedure takes less than 5 ms on a laptop running the system.

Because of the lower resolution of the large interactive display's touch sensor, the camera module cannot reliably be segmented from the rest of the phone. Instead, any contact point inside the phone's area is treated as a potential camera. To accurately discern the actual camera's position, the pairing data are varied in different positions—the variant that the phone transmits for pairing thus reveals the precise camera location.

For the cam device, a Nexus 5 smartphone running Android 5.0.1 was used, however, the scope of the invention is not meant to be limited by this choice, but is intended to include any device having a camera and the other requisite components (i.e., Bluetooth or WiFi, for example). Android 5 provides low-level control over many parameters of the phone's camera, enabling specialized imaging applications like the present invention. In particular, it allows full-manual control over shutter speed, exposure, focus, and color compensation.

The displays on the cap devices typically have a refresh rate of 60 Hz, accurate to within fractions of a Hz. Due to the rolling shutter on the camera of the exemplar phone, the camera frame will usually contain part of one display frame and part of the next display frame. The point in the image at which this break happens will move as the camera moves in and out of sync with the display. If the break moves across the image too quickly, the captured frames will skip or lag with respect to the display, which will invalidate the received data. Thus, the phone's shutter speed is configured so that it captures frames as close to 30 Hz as possible. The Nexus 5 can do so to within 0.3 Hz, such that the break moves at most ⅓ of the frame per second. This is sufficiently stable for the application.

On the camera device, multiple sample points (in the preferred embodiment, 8 sample points) are selected across the height of the camera frame. At each point, the observed color sequence is decoded as a packet. Because it is synchronized closely to the display's frame rate, there will be at least one sample point that is not affected by the rolling shutter break for the duration of the transmission, allowing that sample point to receive the message.

The data packet may have a fixed length, may contain the packet size in the packet, or may be terminated by a terminating color or sequence. Also, the packet header may be changed to indicate different formats for the data packet.

Pairing data is encoded into sequential frames, where each frame consists of a single color. Thus, the pairing data appears visually as a series of flashing solid colors. To match the frame rate of the camera, the frames are transmitted at 30 Hz (thus, when displayed at 60 Hz, each color frame is simply repeated twice). Each packet of pairing data begins with a three-frame header, consisting of one frame each of solid green, red and blue. This sequence is highly unlikely to occur at random, especially at precisely 30 Hz, and so it neatly delineates packets. Furthermore, using one frame of each color enables the camera to calibrate to the display.

Figure 3:
FIG. 3 presents a sample packet as encoded by the display. The packet starts with a three-frame green-red-blue header, followed by 21 color frames containing 6 bits each (using 4 color levels per channel). The raw transmitted bits are shown below each frame.

Following the header, the pairing data is encoded into the R,G,B color values of each frame, depending on the number of color levels configured, with the R, G and B values representing three channels. For example, if 4 color levels per channel (e.g. channel values 0, 85, 170, 255) are used, then each channel encodes 2 bits of data, and so each frame encodes 6 bits, as shown in FIG. 3. A 150-bit message can thus be transmitted in 28 frames (three header frames plus 25 data frames), in just under 1 second.

Modern operating systems perform sophisticated color correction to match display characteristics with human perception. These color corrections include gamma corrections, chromatic shifts, white-point adjustments, and brightness/contrast changes. These color correction algorithms are bypassed by specifying that the color data is pre-corrected to the sRGB color space, thus allowing for the display of "raw" RGB values to the display.

Due to the differences between LCD displays, there will still be a color mismatch between the display on the cap device and the camera on the cam device. The three-color packet header is used to calibrate the camera, computing a color calibration matrix which reduces the observed crosstalk between different channels and normalizes the sensitivity of the camera's response to each channel.

After these corrections, there may still be residual noise. For example, some LCD displays exhibit slow switching times, resulting in intermediate values being received by the camera. Because of this, some level of error correction is required to accurately transmit packets.

The encoding scheme, coupled with the ability to control the camera's shutter timing and color correction, allows for the present invention to achieve speeds much higher than the color transition approach of the prior art, despite the need for error correction. For typical displays, the present invention can achieve bit rates up to 6 times faster than prior art methods (150 bits per second vs. 25 bits per second).

Once the cam device receives and decodes the pairing data packet, it initiates a connection to the cap device. In one embodiment of the invention, the connection is made over WiFi, though any wireless protocol can be used.

The pairing data transmitted using the color-encoding as described above will contain any data necessary to establish this connection. For example, it could contain a Bluetooth hardware address and PIN, a WiFi ad-hoc BSSID and WPA2 key, or an IP address and port if the devices are on a shared network (e.g. cellular network or WiFi access point). The pairing data packet also preferably contains a one-time use passcode, or nonce, which identifies the cam device to the cap device and which can be used as a shared secret to encrypt the communication channel.

Due to inherent noise and non-uniformity from the camera hardware, color space differences, and LCD imperfections, some level of error correction is needed to ensure reliable data transmission. In one variation of the invention, a BCH error-correcting code is appended to each transmitted packet. The precise code configuration used can be optimized based on the capabilities of the screen. In one embodiment, a 42-bit code appended to an 84-bit message was used, capable of correcting any 6 erroneous bits within the 126-bit packet. These parameters were chosen to give a 99% packet transmission rate on the Perceptive Pixel cap device.

When contact is broken between the cam device and the cap device, the cap device can immediately detect the loss of capacitive tracking and optionally terminate the connection if no further interaction is desired. This facilitates rapid and effortless creation and destruction of ephemeral pairings between the devices. Moreover, this serves to require physical proximity for pairings to exist, which is not possible with a purely wireless solution. A time delay may be implemented between the time that the cap device detects the loss of capacitive tracking with the cam device and the time when the connection is actually broken, to accommodate movement of the cam device with respect to the cap device for some applications.

In any pairing technology, where information is sent between two systems, security is a primary consideration. Although CapCam was not designed for transmission of highly sensitive data, it does exhibit several properties that make it reasonably robust against attacks, compared to, for example, entering a PIN into an ATM.

A co-located attacker with line of sight could conceivably intercept the data sent from the cap device's display to the cam device. This line of sight is significantly hindered by the fact the visible light handshake is rendered under the device, thus requiring a camera to be at an oblique angle relative to the display with a large depth of field. The data transmission can be further obfuscated with false patterns presented around the camera module.

Should the attacker be successful in visually intercepting the connection data, they would only gain access to the cap device, not the cam device, and then, only for a brief period of time. Preferably, only one connection is permitted per port/password. Thus, the attacker would have to decode the CapCam packet before the cam device. When the true client cam device does attempt to connect (perhaps a few tens of milliseconds later), the cap device can terminate both connections on grounds of suspicious activity.

Once a cam device is fully connected, the password (nonce) can be used as a cryptographic key for all network communication. Thus, an attacker observing the network would require the password (transmitted by the cap device) to decrypt the communications, and thus would require line-of-sight or the ability to guess the password (in the prototype implementation, a 32-bit number). For high-security applications, a 128-bit random password could be used.

Evaluation of Exemplary Embodiments

An evaluation was conducted to determine various transmission characteristics of CapCam, for example, the bit error rate, packet drop rate, and effective transmission rates over a range of different transmission encodings and devices.

The evaluation was performed using each of the three devices supported by the prototype of the invention to send data: the Nexus 5 smartphone, the Macbook Pro laptop, and the Perceptive Pixel (PPI) multi-touch display. A Nexus 5 smartphone was used in all three cases as a cam device, to receive the data. The display on the cap device is configured to repeatedly flash a random data packet encoded with a random number of color levels (from 2-16 levels per channel) and a random packet length (from 10-20 display frames per packet), with no error correction applied. In each case, the packet was preceded and followed by the standard G,R,B header.

After the display on the cap device flashes the packet, the cam device sends back the received packet (or reports a failure if the packet was not detected) and the result is compared against the original sent packet to determine the bit error rate.

Each device was tested over a period of eight hours. In total, 113,957 packets were sent (over 32,000 per device), and 64 packets were lost, for a packet loss rate of less than 0.06%. In total, 5,106,848 bits of information were transmitted.

Figure 5:
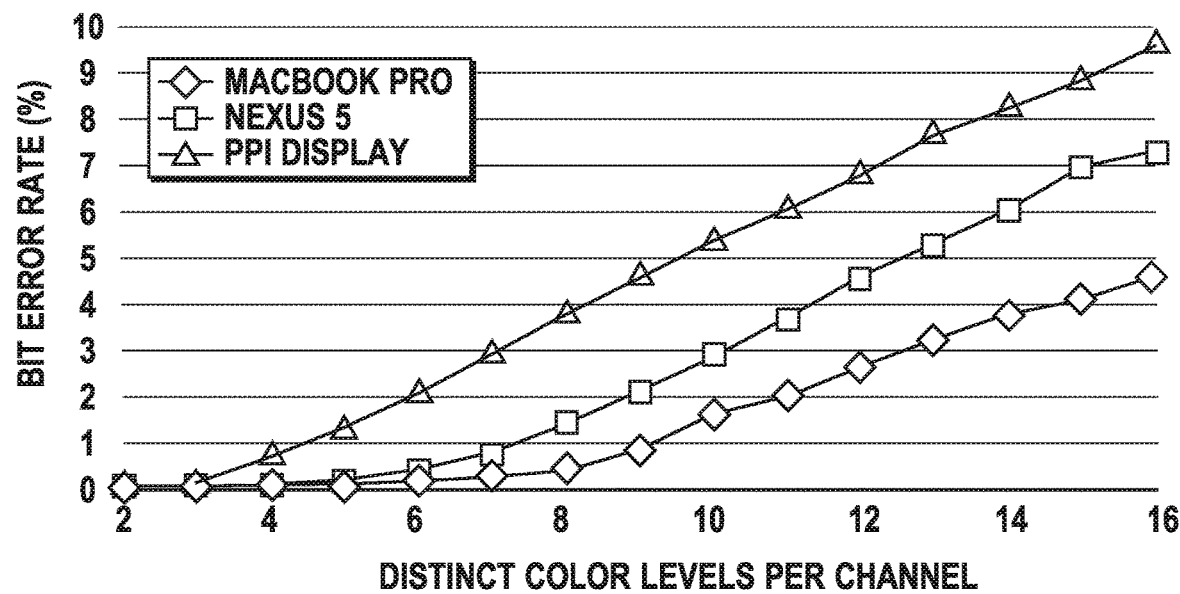
FIG. 5 displays raw bit error rate (% of bits flipped) as a function of color level density.
Figure 6:
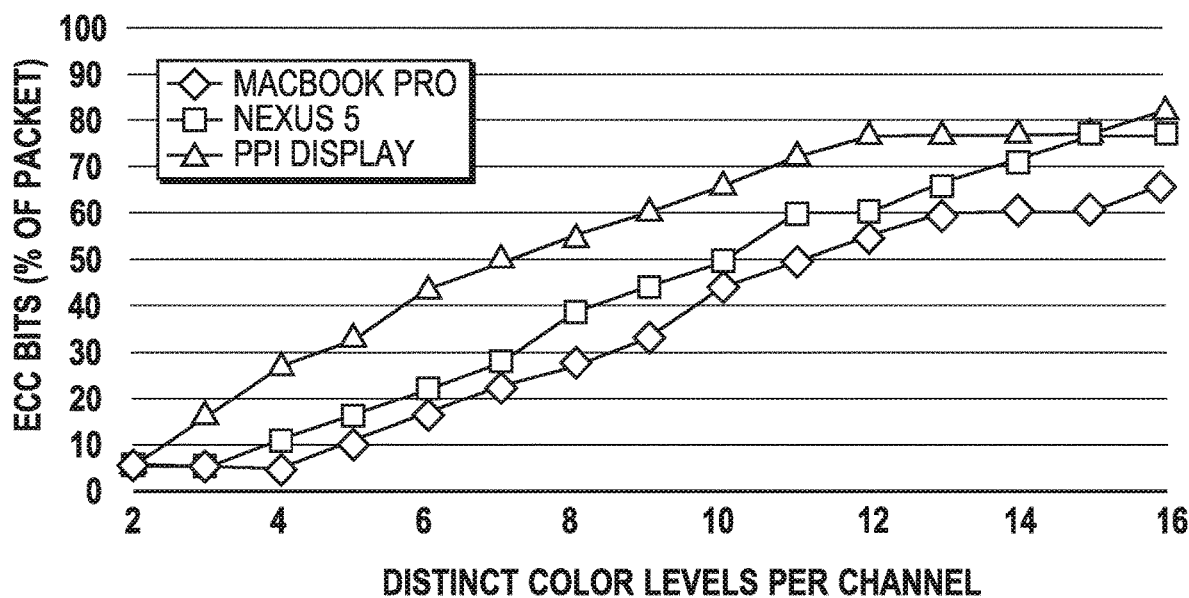
FIG. 6 displays percentage of each packet needed for error correction to attain a packet loss rate of 1%, as a function of color level density.
Figure 7:
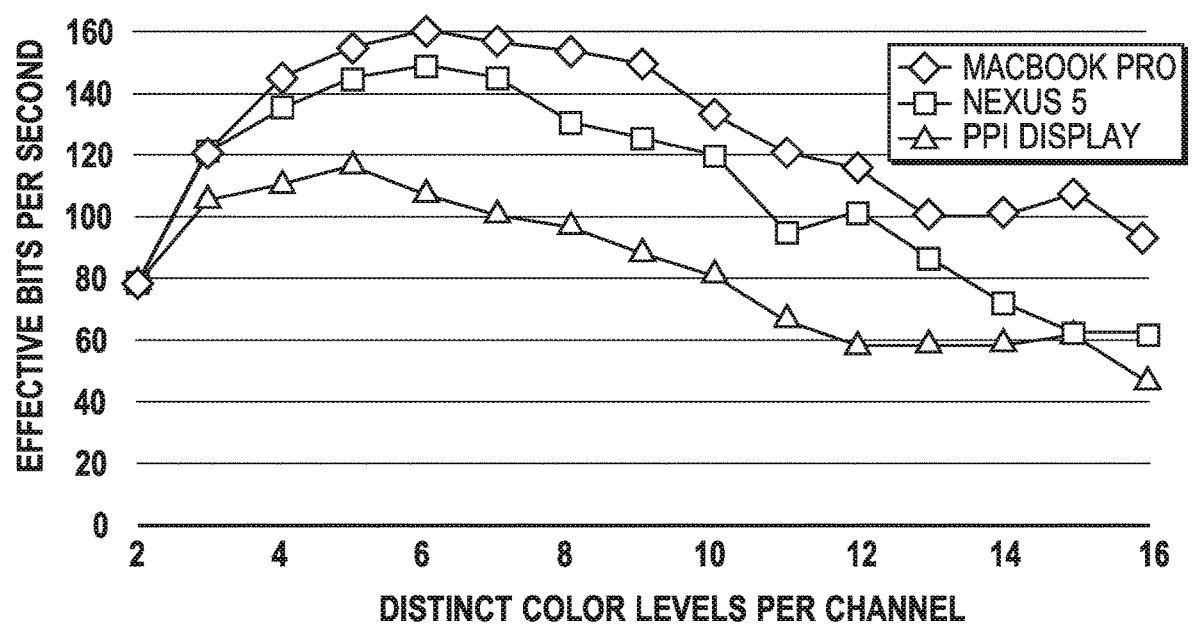
FIG. 7 shows the effective payload data transmission rate as a function of color level density, after applying the error correction necessary for a target packet loss rate of 1%.

For each device and number of color levels, the total raw bit error rate was computed, as shown in the graph in FIG. 5. The error rate increases as the number of levels increases, due to the decreasing separation between adjacent levels. The minimum amount of error correction needed to ensure that 99% of packets are corrected (a packet loss rate of 1%) was calculated, for each encoding level. The error correction levels are shown in the graph in FIG. 6 for a packet size of 127 bits. In all cases, a BCH error correction scheme was used. Finally, based on the resulting effective payload sizes, the net throughput of the system was computed, shown in the graph in FIG. 7. The results show that there is a consistent "peak" of throughput around 4-6 color levels, past which the increased raw throughput is outweighed by the increase in error rate.

As the implementation is designed for a power-of-two number of color levels (for simplicity), 8 levels were chosen for the Macbook and 4 levels for the Nexus 5 and Perceptive Pixel implementations, for bit rates of 150, 135 and 110 bits per second, respectively. These rates are sufficient to send a full setup packet (IP, port, 32-bit passcode) in under one second on all devices. For higher-security applications, 1.5 seconds would be sufficient time to transmit a packet containing a 128-bit key.

Exemplary Applications

To illustrate the potential of the approach, seven example applications were built demonstrating different use cases.

Figure 8:
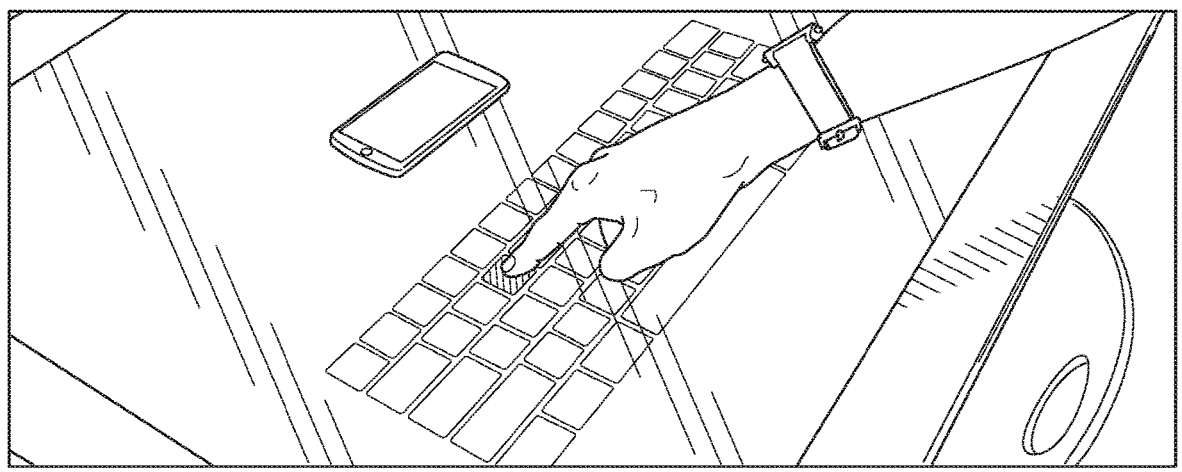
FIG. 8 illustrates a keyboard example. The large screen provides an on-screen keyboard to paired phones, easing text input.

Facilitating Input—A simple application was built that allows the user to enter text on their phone using a larger, more comfortable on-screen keyboard, as shown in FIG. 8. The user simply pairs their cam device (i.e., a smartphone) with the cap device, causing a position-tracked keyboard to appear near their device.

Multiple keyboards and devices could be paired to the same cap device.

Figure 9:
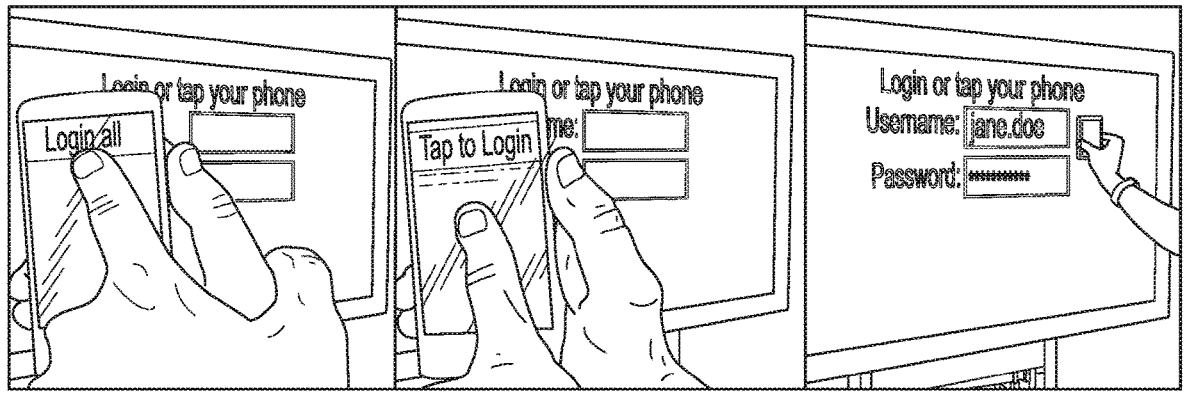
FIG. 9 presents an authentication demo. Instead of entering a password on a highly-visible on-screen keyboard, users select an account (left) on their phone. The credentials are automatically sent after pairing the phone (right).

A demo in which the phone provides input for the cap device was also built. With public kiosks, users often have to enter their authentication credentials on a large touchscreen, where they can be easily observed. In this application, users can press their phone to the display to automatically transmit their credentials rapidly and securely, as shown in FIG. 9.

Figure 10:
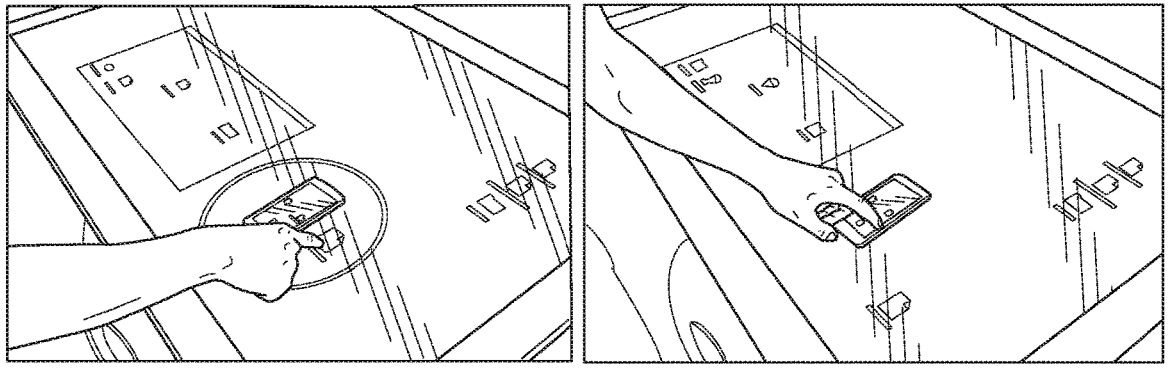
FIG. 10 shows a data transfer between a phone and a desktop. Left: desktop files can be dropped onto the phone. Right: dragging files to the edge of the phone drops them on the desktop.

File & Information Transfer—Data transfer between a phone and a computer is often challenging. In the desktop demo application, users simply pair their cam device (i.e., a smartphone) with the cap device to enable bidirectional drag-and-drop file transfer. Dragging files off the cam device causes them to be copied to the desktop, as shown in the rightmost image in FIG. 10, and vice-versa, as shown in the leftmost image in FIG. 10. The cap device tracks the location of the phone, allowing its physical location to serve as a drop target. File icons and relative radial position are further streamed to render a live preview of the drop location.

Figure 11:
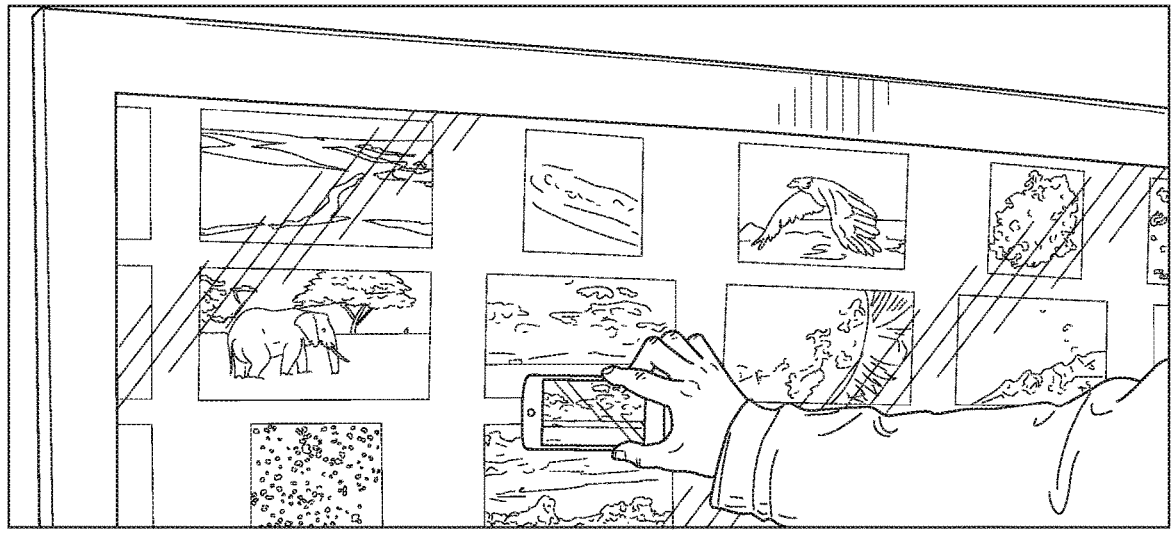
FIG. 11 presents an image gallery example. The user simply presses their phone's camera to an image to download it.

Alternately, users can select files to download by pressing the phone to the file's icon. In the gallery demo, users can grab a high-res image by simply placing their phone camera to it, as shown in FIG. 11. CapCam transmits a secure, shortened URL for the desired content to the phone, which then downloads and displays the image.

Figure 12:
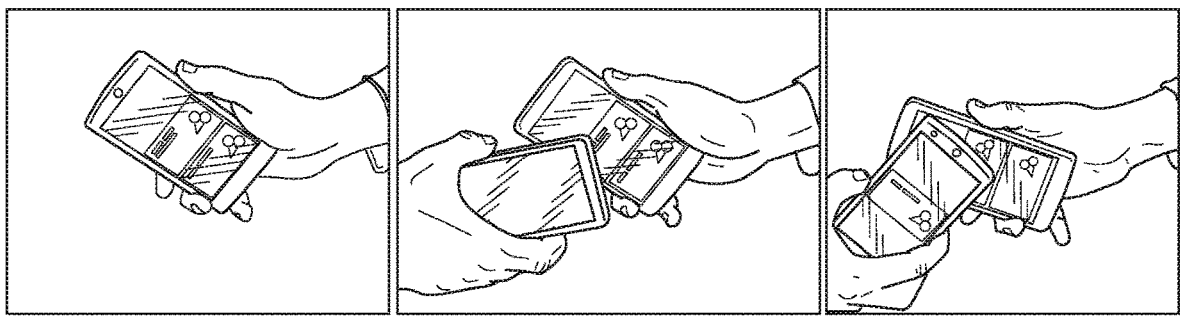
FIG. 12 illustrates a business card exchange. After a meeting, electronic business cards are exchanged. Simply pressing one phone's camera to the other initiates CapCam pairing and downloads the requested card.

The cap device need not always be a large display. In the phone-to-phone business card demo, shown in FIG. 12, two users can exchange business cards by pressing their phones against each other. CapCam transmits an appropriate pairing code (e.g. Bluetooth device ID and PIN) and automatically downloads the selected card file.

Figure 13:
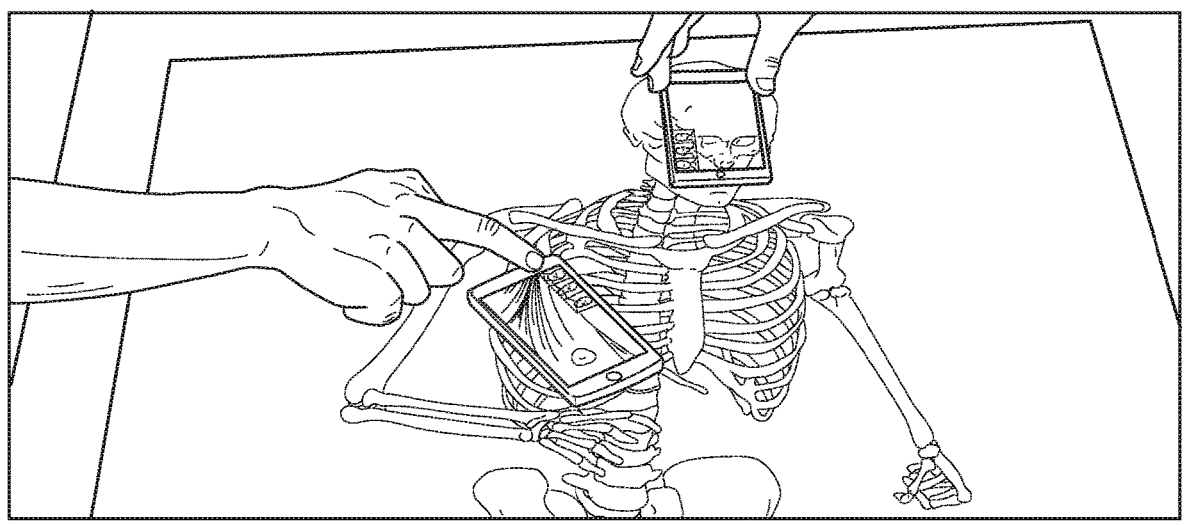
FIG. 13 shows a "Context+Focus" application. The large display shows low-resolution "context" imagery. After pairing phones to the display with CapCam (not shown), the phones display high-resolution "focus" imagery corresponding to their position on screen, allowing users to inspect finer detail. Users can individually switch anatomical layers and change zoom levels.

Phone as Accessory—The cam device can also be used as an accessory for larger displays. In the context+focus demo, shown in FIG. 13, the phone is used as a high-resolution focus display for the larger, low-resolution cap device display. The phone's position and orientation is precisely tracked and transmitted by the cap device, enabling seamless navigation of content.

Games—An air-hockey game has been developed as a demo of the invention. In this demo, two users pair their phones to the cap device to start a match. The phones themselves are used to hit the virtual puck, shown in FIG. 1. Furthermore, the phones can provide stereo audio feedback (e.g. puck hit sounds, goal sirens, and ambient audience sounds), and even individualized haptic feedback, for example, short vibrations when the puck is hit, long vibrations when a goal is scored.

The present invention includes a technique that allows two devices to establish secure, instant and anonymous connections simply by pressing the camera of one device to the touchscreen of another. By exploiting capacitive sensing, CapCam tracks the precise position of the camera device, which combines with rapid pairing to enable a wide range of interactive functionality. From a technical perspective, it has been shown that the present invention can transfer data from the screen on the cap device to the camera on the cam device at up to 150 bits per second with negligible error, far faster than existing color-based transmission schemes. This is used to transmit data needed to establish a faster and more stable connection. Finally, a wide range of fun and useful applications has been demonstrated that showcase the capabilities of the invention.

We claim:

1. A system for pairing devices based on physical contact comprising:
   a first device having a computing capability and a capacitive display capable of detecting contact with objects, the first device performing functions comprising:
   detecting an object in contact with the first device by detecting a blob on the capacitive display;
   determining an approximate size of the blob;
   determining that the object is a second device based on the approximated size of the blob;
   determining a location of a camera module located on a surface of the second device;
   transmitting a data packet by modulating the display of the first device, the modulation containing pairing instructions for establishing a communication link between the second device and the first device;
   wherein the location of the camera module on the surface of the second device is determined by modulating varied pairing data on the display of the first device at each of various locations on the blob and determining which variant of the pairing data is used by the second device to establish the communication link.

2. The system of claim 1 wherein the pairing data comprises data necessary to establish a WiFi or Bluetooth connection between the second device and the first device.

3. The system of claim 1 wherein the pairing data further comprises a nonce which can be used as a key to encrypt data transmitted between the first device and the second device.

4. The system of claim 1 wherein the data packet further comprises error correcting data.

5. The system of claim 4 where a BCH error correcting code is appended to the data packet.

6. The system of claim 1 wherein the modulation of the capacitive display of the first device comprises displaying a series of colored frames at each of the various locations of the camera module on the second device.

7. The system of claim 6 wherein each frame in the series of colored frames encodes bits of data in the data packet using [R,G,B] values defining a color of each colored frame in the series of colored frames.

8. The system of claim 7 wherein the data packet is initiated by a header.

9. The system of claim 8 wherein the header consists of three colored frames.

10. The system of claim 9 wherein the header indicates a start of the transmission of the data packet.

11. The system of claim 6 wherein the series of colored frames is displayed at a fixed effective frame rate.

12. The system of claim 6 wherein the series of colored frames is displayed by the display of the first device at a location of the camera module on the second device and is surrounded by one or more false patterns of colored frames to obfuscate the series of colored frames to third party observers.

13. The system of claim 1 wherein the first device performs further functions comprising:
    awaiting a connection request from the second device for establishing the communication link using the pairing data; and
    establishing the communication link with the second device.

14. The system of claim 13 wherein the first device has an input sensor and further wherein the first device terminates the communication link with the second device when the first device detects that the second device is no longer in contact with the input sensor.

15. The system of claim 14 wherein the communication link is terminated a predetermined time after the first device detects that the second device is no longer in contact with the input sensor, if contact is not re-established within the pre-determined time.

16. The system of claim 14 wherein the first device initiates an application based on a location of the second device on the input sensor.

17. The system of claim 16 wherein the first device can track movements of the second device on the input sensor and can provide information regarding the movements of the second device to a running application on the first device.

18. The system of claim 13 wherein the communication link is terminated if multiple attempts are made to connect to the first device using the pairing data transmitted in the data packet.

* * * * *